United States Patent
Kusunoki et al.

[11] Patent Number: 5,905,048
[45] Date of Patent: May 18, 1999

[54] HIGH TEMPERATURE STABLE ALUMINA AND METHOD OF MANUFACTURING THE SAME

[75] Inventors: Michiko Kusunoki; Masumi Rokkaku; Yuichi Ikuhara, all of Nagoya, Japan

[73] Assignee: Japan Fine Ceramics Center, Nagoya, Japan

[21] Appl. No.: 08/938,153

[22] Filed: Sep. 26, 1997

[30] Foreign Application Priority Data

Sep. 26, 1996 [JP] Japan ................................ 8-277619
Mar. 28, 1997 [JP] Japan ................................ 9-094896

[51] Int. Cl.$^6$ .................................................. C04B 35/10
[52] U.S. Cl. .................................. 501/127; 501/153
[58] Field of Search ................................ 501/127, 153

[56] References Cited

U.S. PATENT DOCUMENTS 5,137,853  8/1992  Ichikawa et al. .................... 501/127

FOREIGN PATENT DOCUMENTS

| 1601802 | 9/1970 | France . |
| 0220019 | 3/1985 | Germany . |
| 6092161 | 7/1981 | Japan . |
| 06211569 | 8/1994 | Japan . |
| 409029097 | 2/1997 | Japan . |

OTHER PUBLICATIONS

T. Hirayama, "High–Temperature Characteristics of Transition $Al_2O_3$ Powder with Ultrafine Spherical Particles", *Communications of the American Ceramic Society*, Jun. 1987, pp. C122–C124.

A. Kato et al., "Preparation of Lanthanum β–Alumina with High Surface Area by Coprecipitation", *Communications of the American Ceramic Society*, Jul. 1987, pp. C157–C159.

"Surface Segregation & Morphology of Mg Dopd δ–Alumina Powders" Monieau et al. J Europ. Ceram Soc. (1995), 15(9), pp. 851–885.

"Surface Segregation, Microstructure and Sinterability of Alpha–Alumina Powders with Magnesium" Durak et al. Metall. Foundry Erg (1994), 20(2), 269–75, 203.

*Primary Examiner*—Paul Marcantoni
*Attorney, Agent, or Firm*—Morgan, Lewis & Bockius LLP

[57] ABSTRACT

To provide a high-temperature stable transition-type alumina that does not undergo transformation into α-alumina even at high-temperature exceeding 1300° C., and a method for producing the transition-type alumina.

A metal aluminum block is placed on a block of α-alumina composed of $Al_2O_3$. Portions of the α-alumina block and the metal aluminum block close to their boundary was strongly heated by contacting the flame of burning gas with the portions. Alumina and a relatively small amount of magnesium are thereby vaporized, and allowed to react with oxygen in the atmosphere, thereby obtaining a transition-type alumina that contains a small amount of magnesium in the crystal structure. The transition-type alumina obtained by this method is substantially of single crystal type, and does not undergo transformation into α-alumina even at high temperatures exceeding 1300° C. and, further, exceeding 1400, but retains a complete transition-type crystal configuration such as δ-alumina and θ-alumina and the like.

6 Claims, 12 Drawing Sheets

HIGH TEMPERATURE STABLE ALUMINA AND METHOD OF MANUFACTURING THE SAME

BACKGROUND OF THE INVENTION

1. Field of the Invention

The present invention relates to a high-temperature stable alumina that does not transform into α-alumina even at a high temperature equal to or greater than 1300° C., in particular, a high temperature exceeding 1400° C., and a method for manufacturing the same. The high-temperature stable alumina of the present invention does not undergo a sharp reduction in specific surface area even at high temperatures, and is useful as a carrier of an automotive exhaust gas cleaning catalyst.

2. Description of the Related Art

Alpha (α)-alumina, which is a high-temperature stable phase of alumina, is widely used due to its excellent characteristics as an industrial material. Various transition-type aluminas obtained by, for example, dehydration of alumina hydrates, are normally porous and have great specific surface areas. Therefore, the transition-type aluminas are excellent in absorption power, catalysis power and the like, and widely used as desiccants, catalysts, catalyst carriers and the like.

However, a normal transition-type alumina starts to transform into the phase of α-alumina at a temperature of about 1000–1100° C. and, simultaneously, starts to undergo rapid particle growth, resulting in a considerable reduction in specific surface area and, therefore, deterioration of the functions as a catalyst or a catalyst carrier. This has become a big problem in applications as, for example, a carrier of an automotive exhaust gas cleaning catalyst, which is frequently exposed to high temperatures.

SUMMARY OF THE INVENTION

Accordingly, the present invention is directed to a high-temperature stable alumina that substantially obviates one or more of problems due to limitations and disadvantages of the related art.

Additional objects and advantages of the invention will be set forth in part in the description which follows, and in part will be obvious from the description, or may be learned by practice of the invention. The objects and advantages of the invention will be realized and attained by means o the elements and combinations particularly pointed out in the appended claims.

To achieve the objects and in accordance with the purpose of the invention, as embodies and broadly described herein, a high-temperature stable transition-type alumina characterized by comprising magnesium element.

It is to be understood that both the foregoing general description and the following detailed description are exemplary and explanatory only are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles on of the invention.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

The present invention is intended to provide a single crystal-type high-temperature stable alumina wherein a small amount of magnesium is contained in a crystal structure of the alumina, and a method of manufacturing the same. The high-temperature stable alumina of the invention does not substantially transform but retains an undisturbed crystal configuration of alumina even at high temperatures, for example, a high temperature of 1300° C. or higher, which is at least 200° C. higher than the temperature at which a conventional transition-type alumina transforms into α-alumina, furthermore, even at a high temperature exceeding 1400° C.

A high-temperature stable transition-type alumina according to a first invention is characterized by comprising magnesium element. A high-temperature stable transition-type alumina according to a second invention is characterized by comprising magnesium element, the magnesium element being contained in an amount of 0.1 to 50 atom % relative to 100 atom % of aluminum contained in the transition-type alumina. A high-temperature stable transition-type alumina according to a third invention is characterized in that the magnesium element is contained in an amount of 0.3 to 30 atom %. A high-temperature stable transition-type alumina according to a fourth invention is characterized in that if the transition-type alumina is heated at a temperature of 1300 to 1600° C., substantial transformation to α-alumina does not occur.

A high-temperature stable transition-type alumina according to a fifth invention is characterized by comprising magnesium element and being in the form of a single crystal. A high-temperature stable transition-type alumina according to a sixth invention is characterized in that magnesium element is contained and that a streak occurs in a specific direction in an electron diffraction pattern of the transition-type alumina.

The α-alumina, used widely as an industrial material, may be obtained by adding powder of an oxide, such as MgO, CaO or the like, as a sintering assistant agent, to a material powder, and then sintering the mixture. In this case, magnesium is not contained as an element in the α-alumina crystal grains. The α-alumina is of polycrystal type, unlike the high-temperature stable transition-type alumina of the invention, which is of single crystal type.

In the high-temperature stable transition-type alumina according to the first invention, it is considered that the "magnesium element" is contained as magnesium atoms in the crystal structure, and bound to aluminum atoms or oxygen atoms. In the high-temperature stable transition-type alumina according to the second invention, the content of the magnesium element is "0.1 to 50 atom %" relative to 100 atom % of aluminum contained in the transition-type alumina. If the magnesium element content is less than 0.1 atom %, transformation into α-alumina at high temperatures cannot be sufficiently suppressed. The upper limit of the amount of magnesium atoms contained in the alumina crystal is 50 atom %. If this limit is exceeded, magnesium atoms become magnesium oxide and mixes with alumina.

If the magnesium element content is "0.3 to 30 atom %" as in the third invention, the transformation of the transition-type alumina into α-alumina can be sufficiently suppressed. If the magnesium element content exceeds 30 atom %, the particle diameter of the transition-type alumina tends to become large. For example, a spinel having a chemical composition of $MgAl_2O_4$ and a cubic system crystal structure is known as an oxide that contains magnesium in an amount ratio as high as ½ to aluminum, which is the upper limit according to the invention. Although the spinel is of single crystal type, its particle diameter is relatively large, that is, normally 1 to several micrometers and, in the case of specially fine particles, about 0.3 μm. Although a smaller particle diameter is normally more preferable for a catalyst carrier, a carrier having a particle diameter similar to that of the spinel is sufficient for use as a catalyst carrier.

The magnesium element content is preferably 0.3–25 atom % and, more preferably, 0.5–15 atom %. To reliably suppress transformation into α-alumina at higher temperatures, the amount ratio of magnesium element is preferably 1–12 atom % and, more preferably, 3–10 atom %. If the magnesium element content is within the preferred range, preparation of a high-temperature stable transition-type alumina is easy and, the obtained transition-type alumina reliably will suppress transformation into α-alumina at higher temperatures. The magnesium element content varies depending on individual particles of powder of the transition-type alumina prepared on the basis of the aforementioned range.

The high-temperature stable transition-type alumina of the invention does into transform into α-alumina even at a high temperature equal to or higher than 1200° C. A conventional transition-type alumina containing no magnesium element transforms into α-alumina normally at a temperature exceeding 1000° C., and certainly at a temperature exceeding 1100° C. At such temperatures, the conventional transition-type alumina undergoes rapid particle growth and a considerable reduction in specific surface area, so that the alumina become unusable as a catalyst carrier or the like. The high-temperature stable transition-type alumina of the invention remains stable at high temperatures of "1300 to 1600° C." as in the fourth invention, and further, stable at temperatures of 1400 to 1600° C. Therefore, the high-temperature stable transition-type alumina of the invention is very useful as a carrier of an automotive exhaust gas cleaning catalyst.

The α-alumina, widely used as an industrial material, contains magnesium in the form of MgO, and the α-alumina is of polycrystal type, as stated above. On the other hand, the high-temperature stable transition-type alumina of the invention is of "signal crystal type" as in the fifth invention, and retains the single crystal of δ-alumina, θ-alumina or the like even after being exposed to a high temperature. It is not necessarily clear in what formation the magnesium contained as an element exists within the single crystal. However, it is certain that the high-temperature stable transition-type alumina of the invention has a crystal structure wherein a "streak" occurs in a specific direction in an electron diffraction pattern of the transition-type alumina as in the sixth invention. This is considered to be an effect of the magnesium contained.

A high-temperature stable transition-type alumina production method according to a seventh invention is characterized in that an α-alumina containing magnesium oxide and an aluminum metal are disposed in contact with each other or in proximity to each other, and then the α-alumina and the aluminum metal are strongly heated to vaporize magnesium and aluminum, and the magnesium, the aluminum and oxygen in the atmosphere are allowed to react so as to produce superfine particles of transition-type alumina, and the superfine particles are collected to obtain powder of the transition-type alumina.

The "magnesium oxide" is normally used as a sintering assistant agent to produce the "α-alumina". The amount of the magnesium oxide contained in the α-alumina is not particularly limited. However, in view of the object of the invention, the amount is preferably about 0.1–1.5 wt. % and, more preferably, about 0.2–1 wt. %. The "strong heating" can be performed by burning a normal combustible gas, such as propane gas, natural gas or the like, and placing the flame in contact with a boundary portion between the α-alumina and the "aluminum metal". Magnesium and aluminum are thereby vaporized and react with oxygen present in the atmosphere, thereby producing the "superfine particles" of a transition-type alumina. The superfine particles can be collected by a mesh body formed of copper, stainless steel or the like, the mesh body being placed in a direction in which the superfine particles rise. The "powder" can thereby be obtained.

The present invention will be described in detail hereinafter with reference to examples and the drawings.

Figure 1:
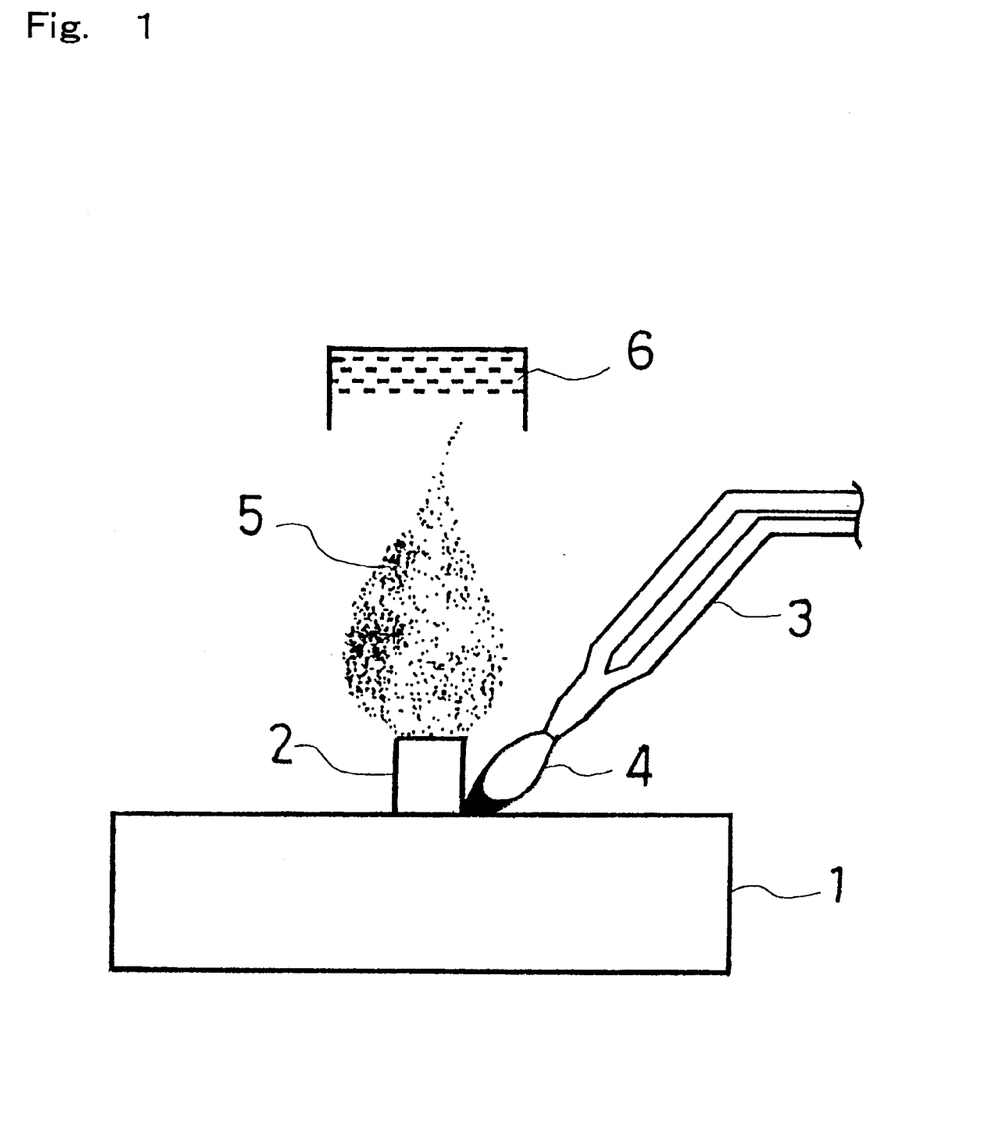
FIG. 1 is an example of an experiment apparatus for producing a transition-type alumina powder containing a small amount of magnesium element.

EXAMPLES AND COMPARATIVE EXAMPLES (1) Production of High-Temperature Stable Transition-type Alumina Powder Containing Magnesium Element FIG. 1 is a schematic view of an experiment apparatus that produced a high-temperature stable transition-type alumina. In FIG. 1, reference numeral 1 represents a block of α-alumina containing MgO in an amount of 0.2–1 wt. %, and 2 represents a block of aluminum metal, and 3 represents a burner, and 4 represents a flame. Reference numeral 5 represents vapor of a high-temperature stable transition-type alumina produced, and 6 represents a copper-made mesh for trapping the vapor and forming powder of solid transition-type alumina.

The α-alumina block 1 has outside dimensions of 200× 100×thickness of 80 mm, and the aluminum metal block 2 has outside dimensions of 5×5×thickness of 10 mm. The aluminum metal block 2 was placed on a central portion of the α-alumina block 1, and the burner 3 was supplied with natural gas and oxygen for combustion. Portions of the α-alumina block 1 and the aluminum metal block 2 around their contact boundaries were strongly heated by placing the burner 3 so that the distal end of the flame 4 contacted the portions. In this manner, superfine particles of a transition-type alumina were produced from aluminum vapor produced from the aluminum metal block 2, a small amount of magnesium vapor produced from the α-alumina block 1, and oxygen present in the atmosphere.

The vapor of the produced transition-type alumina superfine particles was trapped by the copper-made mesh 6 placed at a height of 20 mm above the aluminum metal block 2, thereby obtaining powder of the transition-type alumina containing magnesium element. The substantial average amount of magnesium element contained in the transition-type alumina powder can be adjusted by suitably varying the MgO content in the α-alumina block 1, the temperature of the strong heating, and the like.

(2) Production of Transition-type Alumina Powder Containing No Magnesium Element Powder was formed in substantially the same manner as in the above (1), except that the α-alumina block 1 was not used. That is, only the aluminum metal block 2 was strongly heated, and, by trapping the vapor in the same manner, transition-type alumina powder containing no magnesium element was obtained.

(3) Quantification of Magnesium Element Contained in Transition-type Alumina Powder Obtained in (1)

(i) Quantification by Electron Probe Micro Analysis (EPMA)

Apparatus: Model "JXA-8600"
By Nippon Denshi Kabushiki Gaisha
Measuring Conditions:
Acceleration Voltage 15 kv
Current: $5 \times 10^{-8}$ A
Measuring Time: 30 seconds
Irradiation Area: 1 μm In the EPMA analysis, magnesium element was quantified with respect to the transition-type alumina powder obtained by strong heating at the highest temperature in the above (1). As a result, the amount of aluminum was 19.1405 atom %, and the amount of magnesium was 1.9233 atom %, and the amount of oxygen was 78.9361 atom %, relative to 100 atom % of the transition-type alumina powder. The ratio of the amount of magnesium to 100 atom % of aluminum calculated from those values is about 10 atom %. The value of oxygen was great because correction of its standard value was different. However, this creates no significant problem in the calculation of the amount ratio, for the atomic numbers of aluminum and magnesium are next to each other.

(ii) Quantification by Electron Dispersion X-Ray Analysis (EDS)

Figure 2:
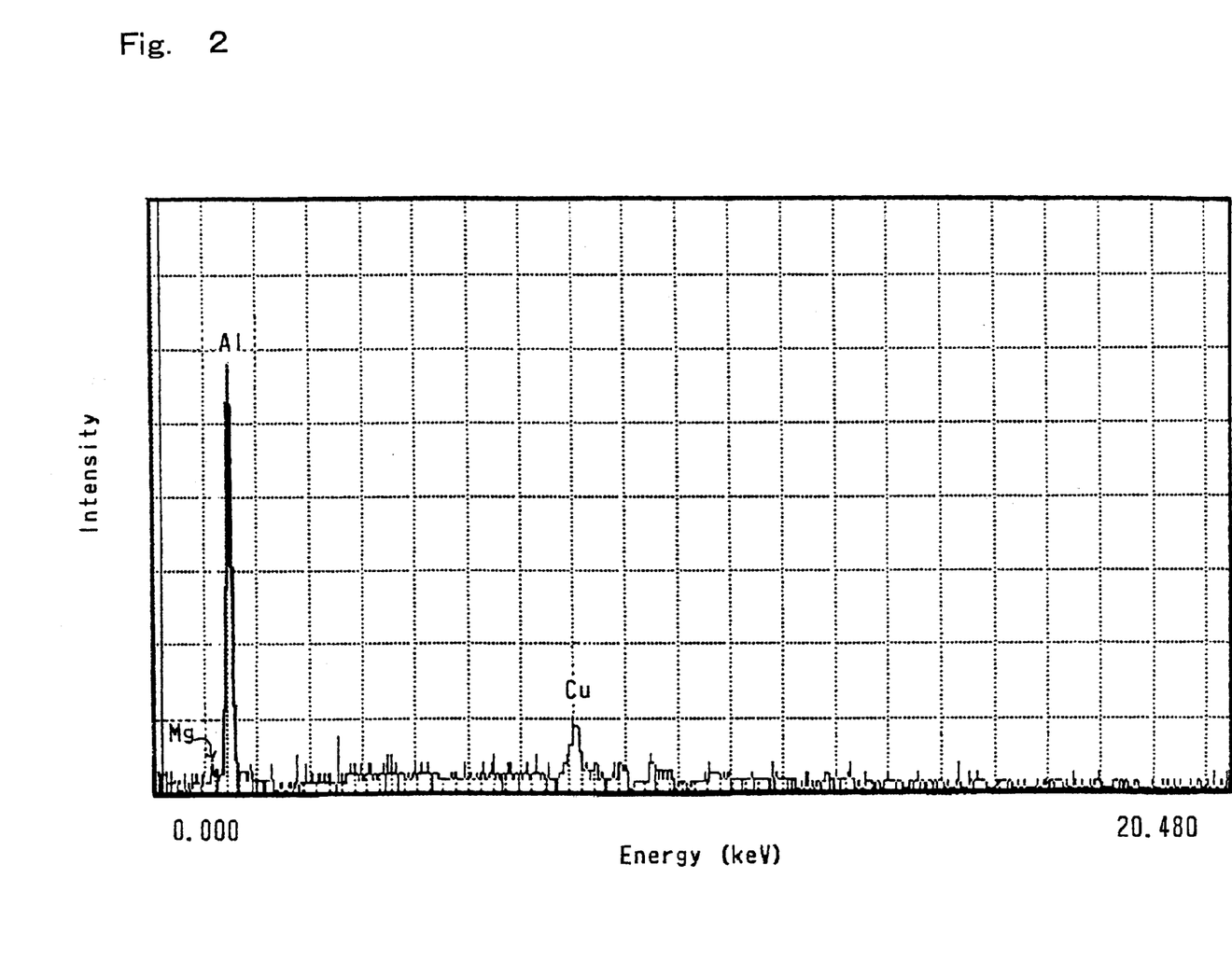
FIG. 2 is a chart indicating results of EDS measurement of a transition-type alumina containing magnesium element in an amount of 1 atom % or less.
Figure 3:
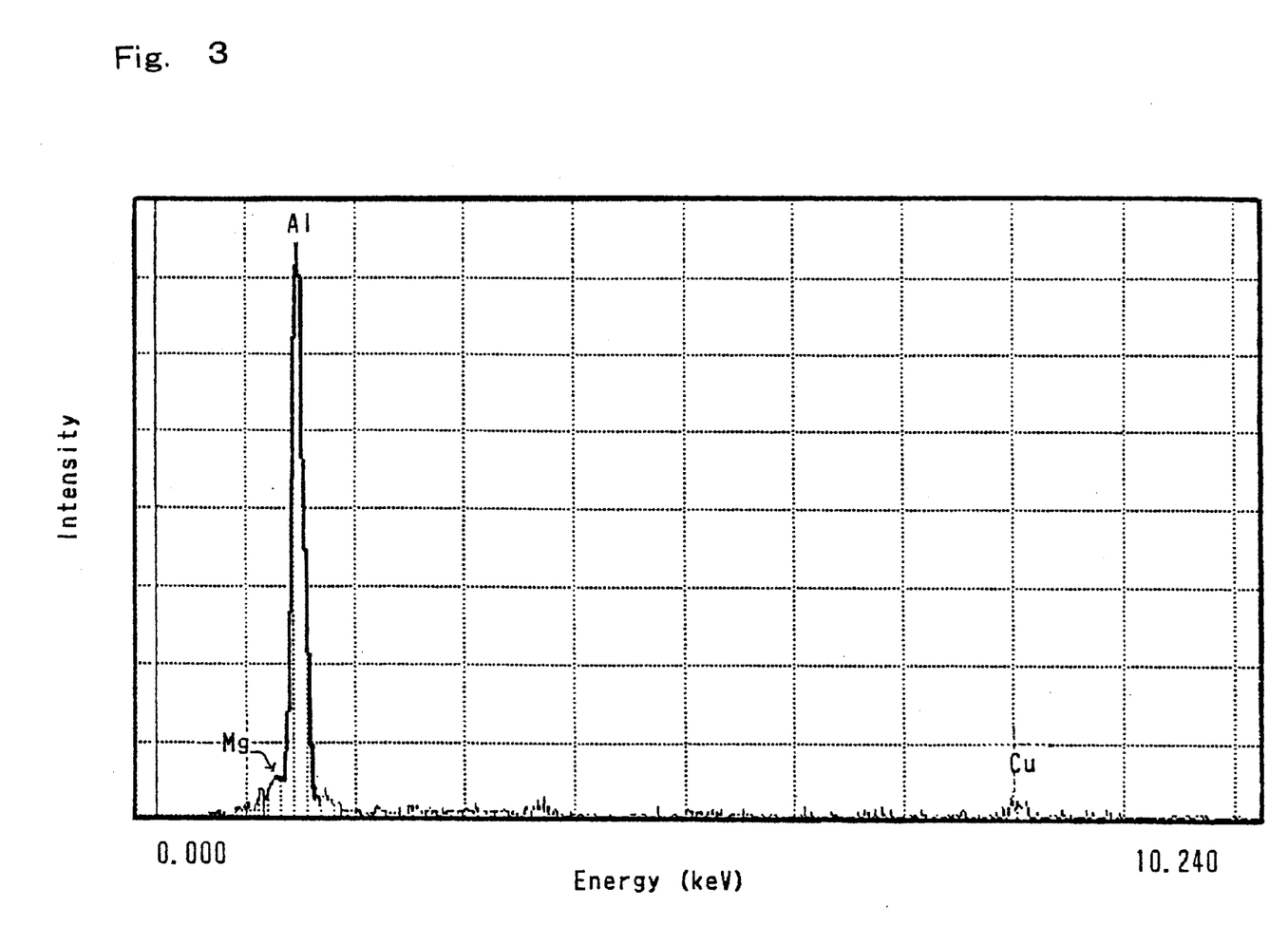
FIG. 3 is a chart indicating results of EDS measurement of a transition-type alumina containing magnesium element in an amount of 6 atom %.
Figure 4:
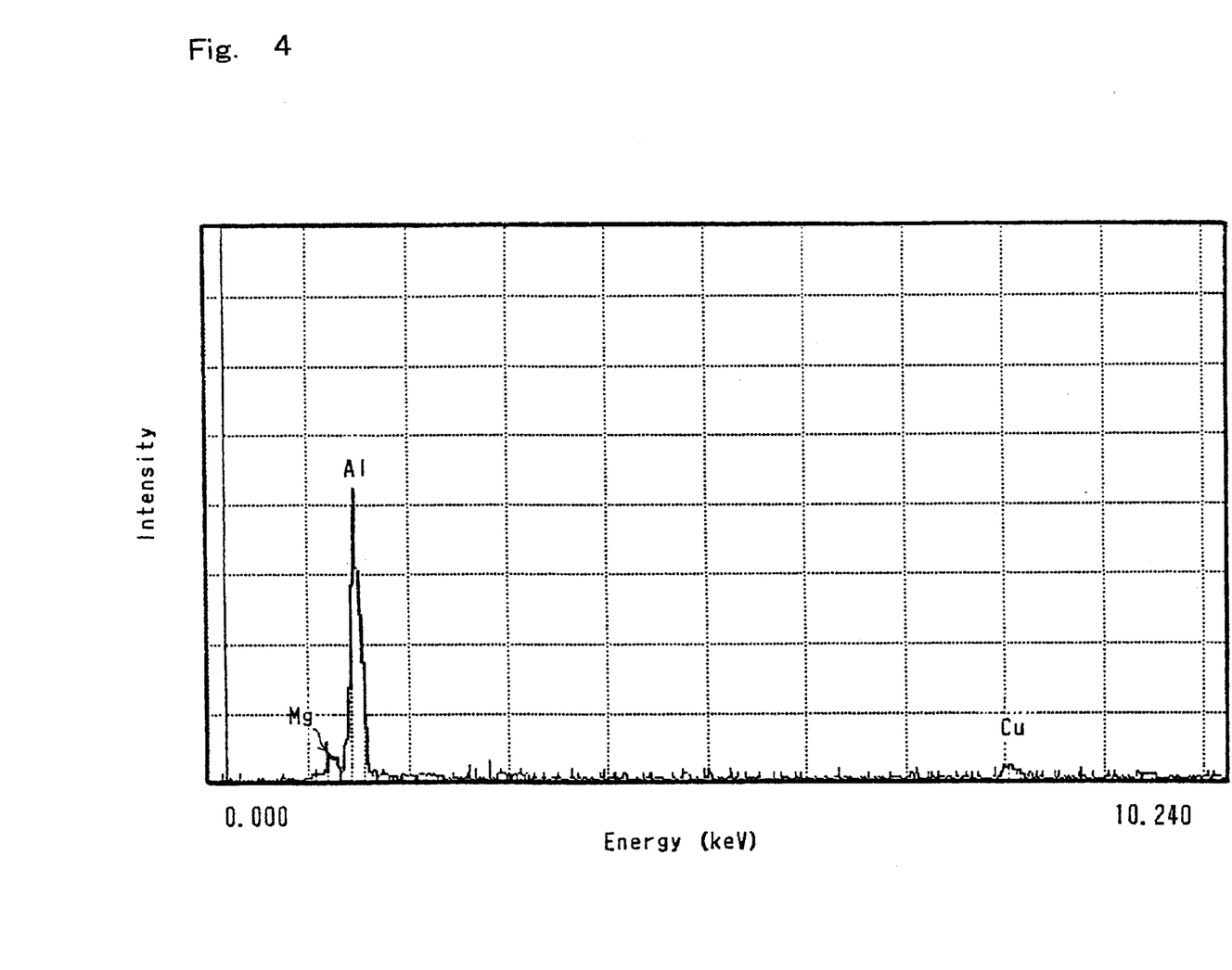
FIG. 4 is a chart indicating results of EDS measurement of a transition-type alumina containing magnesium element in an amount of 10 atom.

Apparatus: Electron Microscope, Model "JEM-4000FX"
By Nippon Denshi Kabushiki Gaisha
Measuring Conditions:
Acceleration Voltage: 400 kv
EDS: by Toreikoa Nozan* (for heavy elements) (* phonetically translated)
Measuring Conditions:
Irradiation Area: 40 nm
Irradiation Time: 10 seconds Results of the EDS analysis are indicated in FIGS. 2–4. Magnesium contents were calculated from the peak areas of aluminum and magnesium on the EDS charts. In FIG. 2, although a magnesium peak is observed, the magnesium content in the transition-type alumina is determined as 1 atom % or less because it is difficult to quantify magnesium in an amount of 1 atom % or less in the EDS. In FIG. 3, it is indicated that about 6 atom % of magnesium was contained. In FIG. 4, it is indicated that about 10 atom % of magnesium was contained. From these results, it is deduced that the transition-type alumina powder had at least particles that contained magnesium in an amount of 1 atom % or less to about 10 atom %. The Cu peaks observed in FIGS. 2–4 from the copper meshes used to trap transition-type alumina vapor. No oxygen was detected since the EDS apparatus for heavy elements was used.

Figure 5:
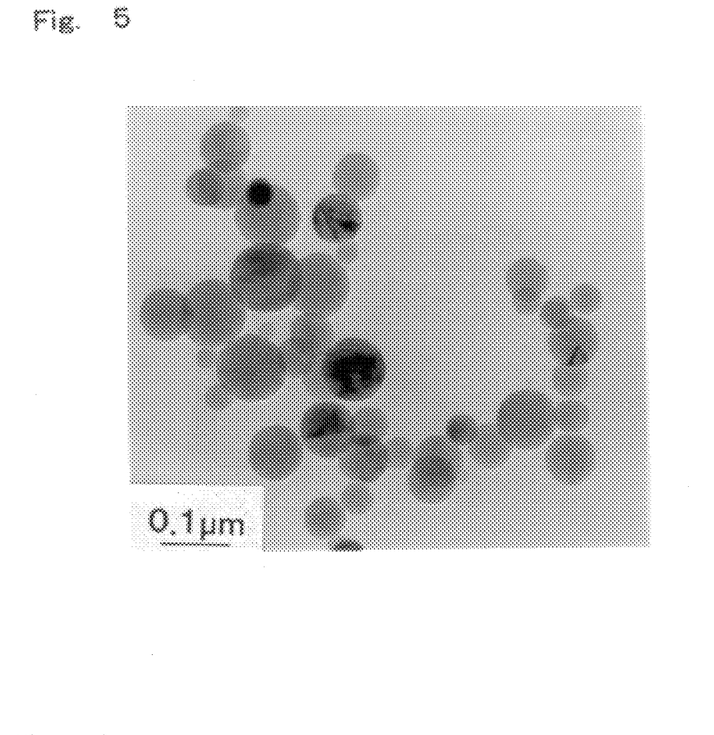
FIG. 5 is an electron microscope photograph showing the particle structure of the magnesium element-containing transition-type alumina obtained by the experiment apparatus shown in FIG. 1.
Figure 7:
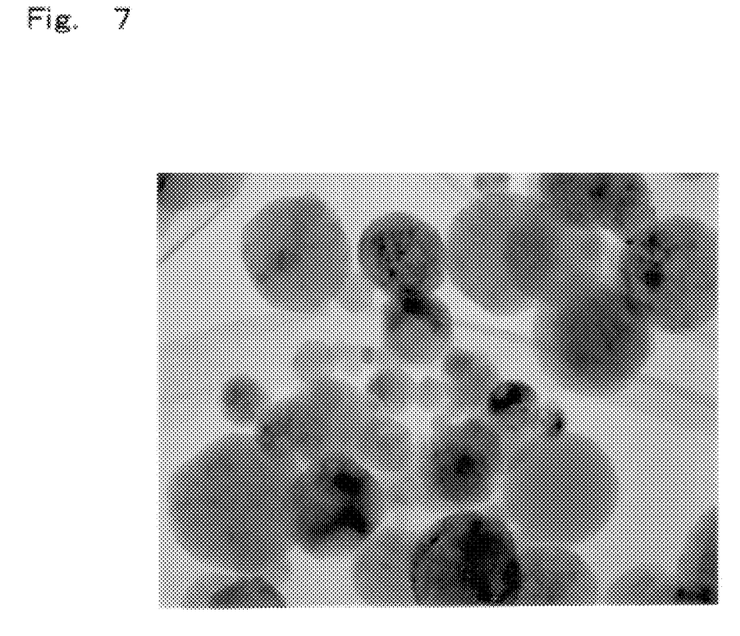
FIG. 7 is an electron microscope photograph showing the particle structure of a commercially-obtained transition-type alumina powder having a spinel-type crystal structure.
Figure 9:
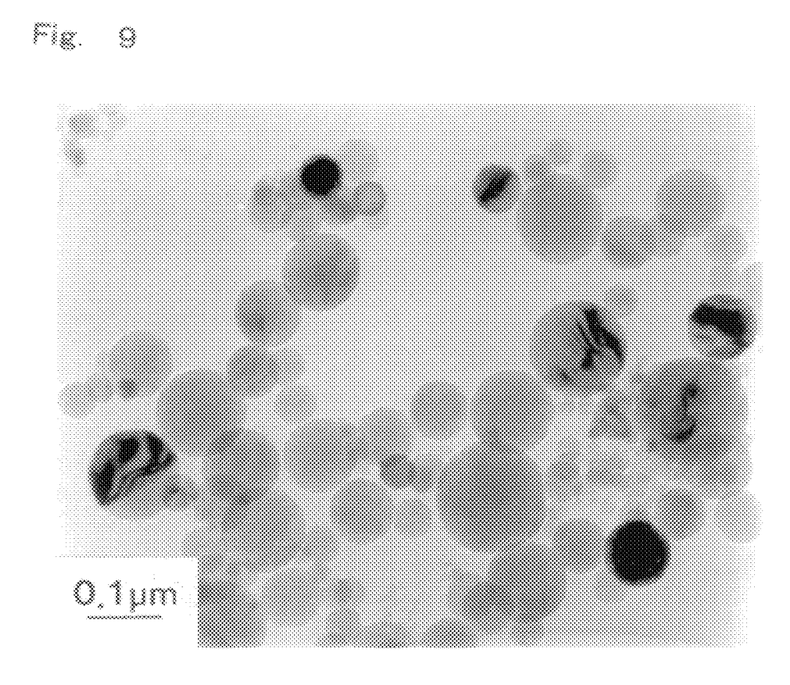
FIG. 9 is an electron microscope photograph showing the particle structure of the transition-type alumina containing no magnesium element which was produced by the experiment apparatus shown in FIG. 1 without using an α-alumina block.

(4) Confirmation of Particle Shape and Crystal Configuration of Transition-type Alumina Powder (i) Confirmation of Particle Shape and Crystal Configuration before High-Temperature Heating An electron microscope was used to observe particle shapes of powder of the high-temperature stable transition-type alumina obtained by strong heating at the highest temperature in the above (1) (containing magnesium element in an amount of about 10 atom % as mentioned above), powder of a commercially-obtained transition-type alumina having a spinel structure, and powder of the transition-type alumina not containing magnesium element, which was produced in the above (2). Results are shown in FIGS. 5, 7, and 9. Each of the figures shows an electron microscope photograph magnified by 120,000 times. As can be apparently seen from FIG. 5 and, the alumina particles had highly regular shapes close to complete spheres, regardless of the presence/absence of magnesium. In the spinel shown in FIG.

7, slight distortion in the alumina shape was observed, but particles having shape close to complete spheres was also observed.

Furthermore, as shown in FIGS. 5 and 9, there was no difference in average particle diameter, regardless of the presence/absence of magnesium. In both cases, the average particle diameter was 70–80 nm. On the other hand, in the spinel in FIG. 7, large-diameter particles were present, and the average particle diameter was relatively large, that is, 100–120 $\mu$m. The crystal configurations of the transition-type alumina powders produced in (1) and (2) were confirmed by electron diffraction. In both powders, the $\delta$-alumina or $\theta$-alumina of transition-type alumina was confirmed. Thus, it is understood that all of the spinel and the transition-type alumina powders produced in the methods (1) and (2) are composed of transition-type alumina regardless of whether magnesium element is contained, unless they are exposed to a high temperature.

(ii) Effects of Heating at High Temperatures

Figure 6:
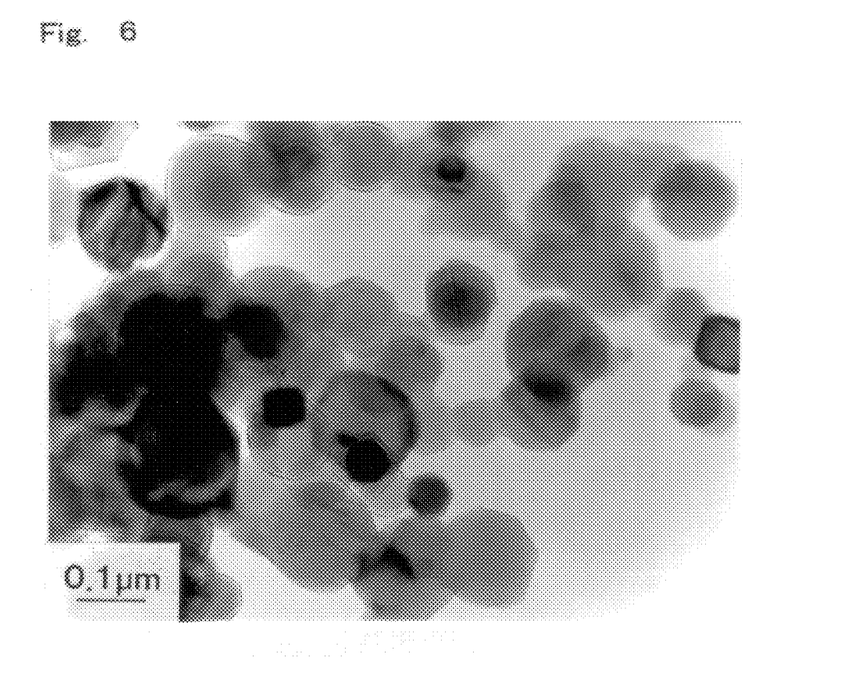
FIG. 6 is an electron microscope photograph showing the particle structure of the transition-type alumina shown in FIG. 5 after it was heated at 1400° C. for 6 hours.
Figure 8:
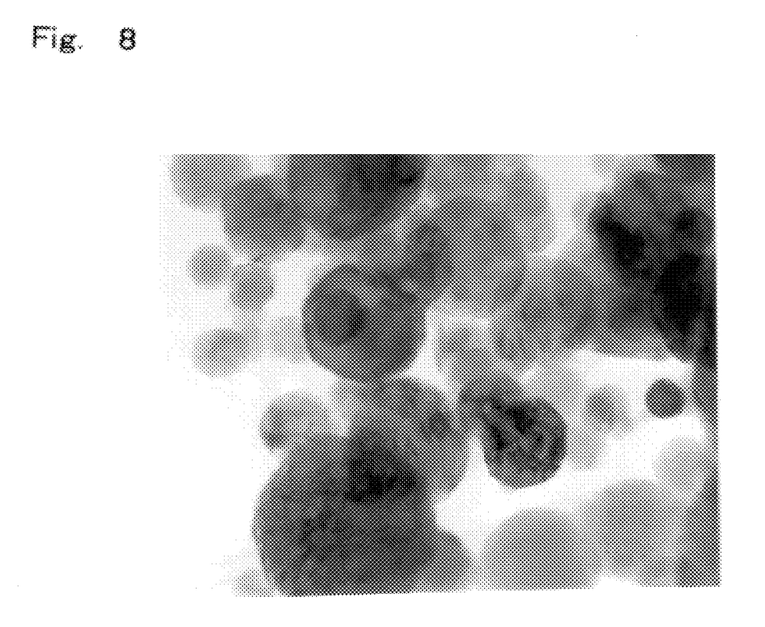
FIG. 8 is an electron microscope photograph showing the particle structure of the transition-type alumina shown in FIG. 7 after it was heated at 1300° C. for 6 hours.
Figure 10:
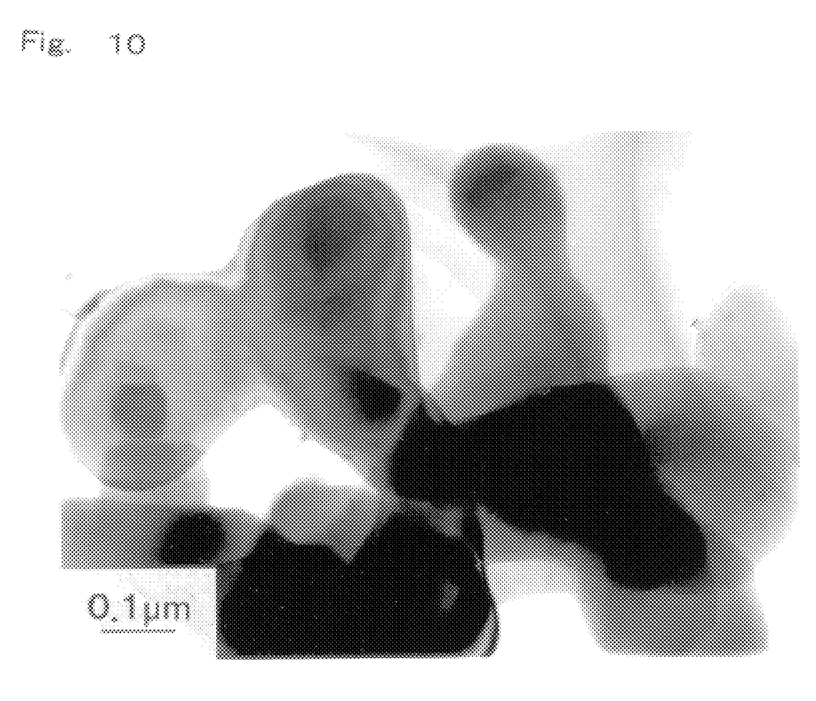
FIG. 10 is an electron microscope photograph showing the particle structure of the transition-type alumina shown in FIG. 9 after it was heated at 1400° C. for 6 hours.
Figure 11:
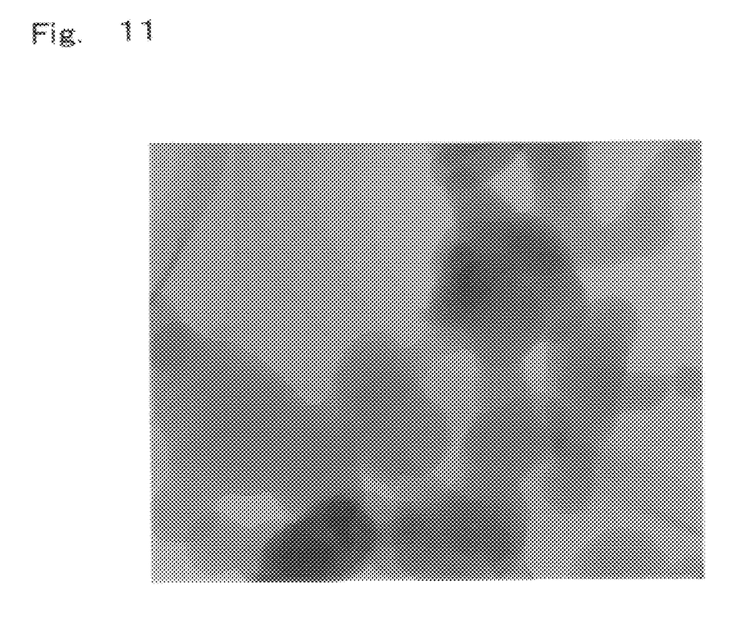
FIG. 11 is an electron microscope photograph showing the particle structure of the transition-type alumina shown in FIG. 9 after it was heated at 1300° C. for 6 hours.

The transition-type alumina powders produced by the methods (1) and (2) were heated at 1400° C. in a vacuum for 6 hours. The particle shapes after heating are shown in FIGS. 6 and 10, respectively. The spinel powder and the transition-type alumina powder produced by the method (2) were heated at 1300° C. in a vacuum for 6 hours. The particle shapes after heating are shown in FIGS. 8 and 11, respectively. Each of the figures shows an electron microscope photograph of the figures shows an electron microscope photograph magnified by 120,000 times. As can be apparently seen from the photographs, in the transition-type alumina powder containing magnesium in FIG. 6 and the spinel powder in FIG. 8, the shapes of fine particles were slightly changed, and slight initial sintering was observed. However, the particle size did not substantially change from that before heating, and no substantial particle growth occurred, as indicated in the photographs. It was also confirmed by electron diffraction that the crystal structure was completely maintained as the $\delta$-alumina or $\theta$-alumina or the spinel structure.

In the transition-type alumina powders containing no magnesium shown in FIGS. 10 and 11, considerable particle growths to similar extent were observed despite the 100° C. difference in heating temperature. The particle diameter in both powders was at least 0.5 $\mu$m, as can be seen from FIGS. 10 and 11. As for the crystal structure confirmed by electron diffraction, it was confirmed that neither $\delta$-alumina or $\theta$-alumina was observed int he least, but that the entire crystal structure transformed into $\alpha$-alumina.

(iii) Effects of High-Temperature and Long-Hour Heating

Figure 12:
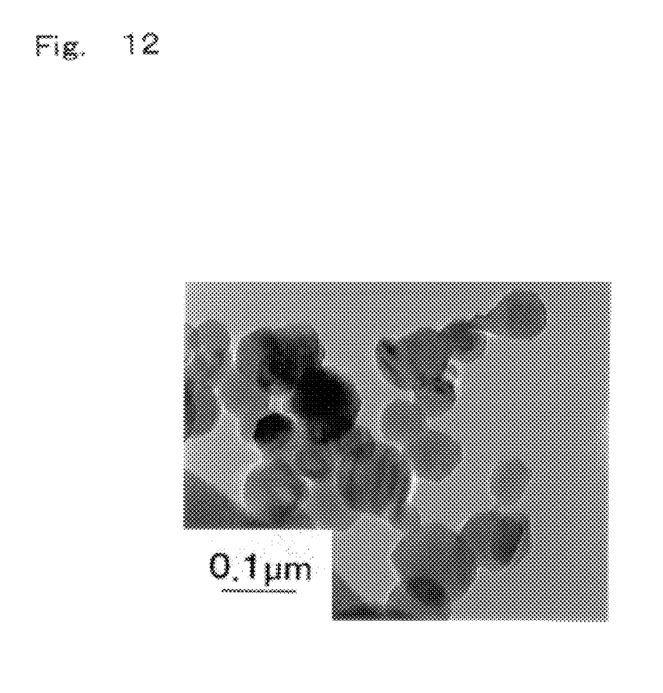
FIG. 12 is an electron microscope photograph showing the particle structure of the transition-type alumina shown in FIG. 5 after it was heated at 1300° C. for a month.

The high-temperature stable transition-type alumina powder containing magnesium which was subjected to electron microscope observation and the like in above (i) was heated at 1300° C. in a vacuum for a month. FIG. 12 shows an electron microscope photograph thereof magnified by 120,000 times. As can be apparently seen from the photograph, neither a significant change in fine particle shape nor a significant particle growth occurred. The particle diameter was substantially the same as that before heating. This is because the heating temperature was 100° C. lower than 1400° C., which is the heating temperature in the above (ii). However, the heating temperature of 1300° C. is 200–300° C. higher than 1000–1100° C., which are the temperatures at which conventional transition-type aluminas transform into $\alpha$-alumina even when exposed to high temperatures for a long time.

(iv) Effects of Heating at Higher Temperature

Figure 13:
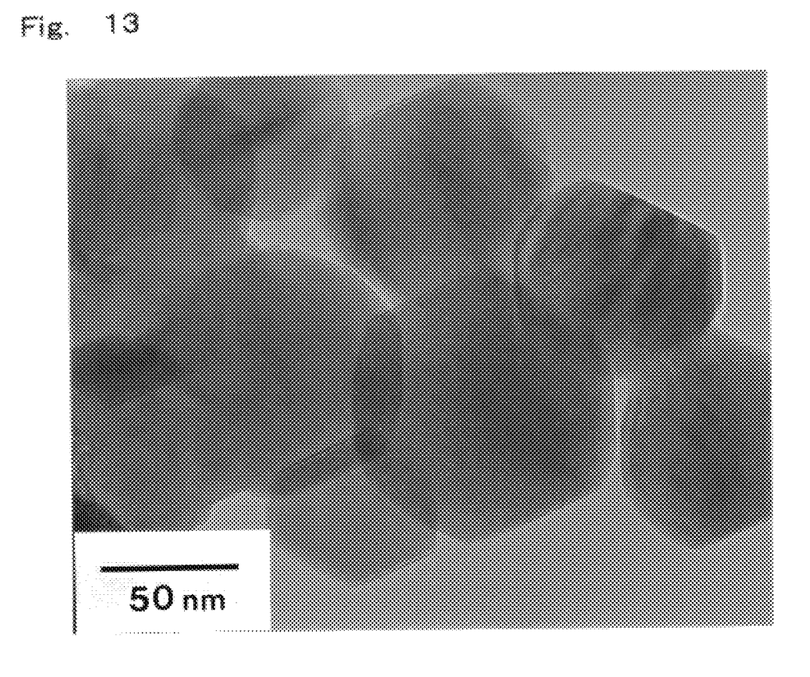
FIG. 13 is an electron microscope photograph showing the particle structure of the transition-type alumina shown in FIG. 5 after it was heated at 1500° C. for 120 hours, showing a portion where particle growth hardly progressed.
Figure 14:
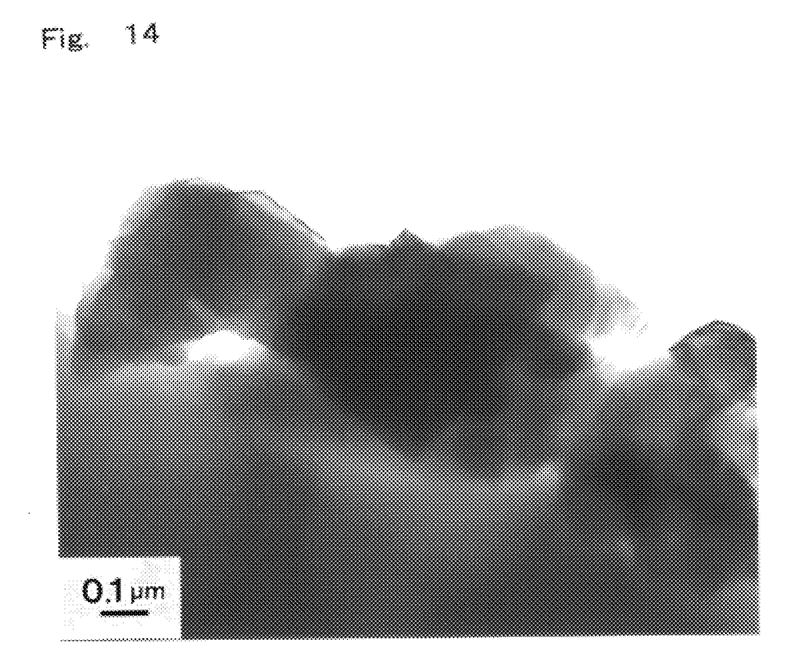
FIG. 14 is an electron microscope photograph showing the particle structure of the transition-type alumina shown in FIG. 5 after it was heated at 1500° C. for 120 hours, showing a portion where particle growth considerably progressed.

The high-temperature stable transition-type alumina powder containing magnesium which was subjected to electron microscopic observation and the like in above (i) was heated at 1500° C. in a vacuum for 120 hours. FIGS. 13 and 14 show electron microscope photographs of the same powder in different visual fields. The magnification is 500,000 times in FIG. 13 and 80,000 times in FIG. 14. As can be apparently seen from the photographs, situations largely vary depending on locations when exposed to this level of high temperatures. In FIG. 13, the change in crystal configuration was small, and particle growth hardly progressed. On the other hand, in FIG. 14, particle growth progressed to a considerable extent.

Figure 15:
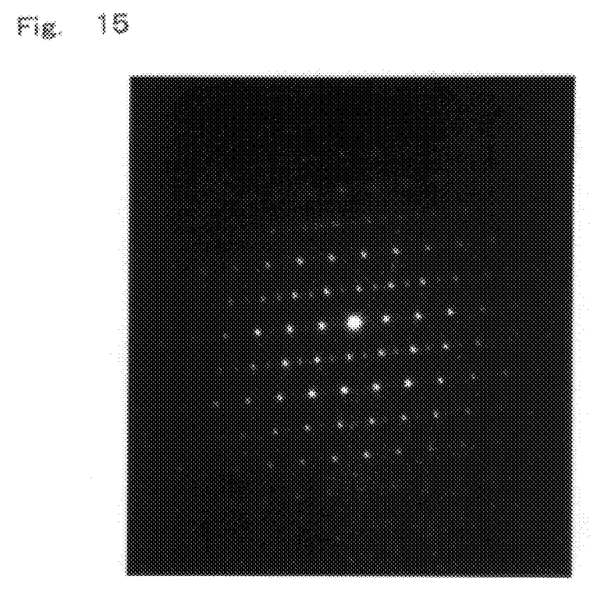
FIG. 15 is a photograph showing an electron diffraction pattern of the crystal structure in the portion shown in FIG. 14, where particle growth considerably progressed.
Figure 16:
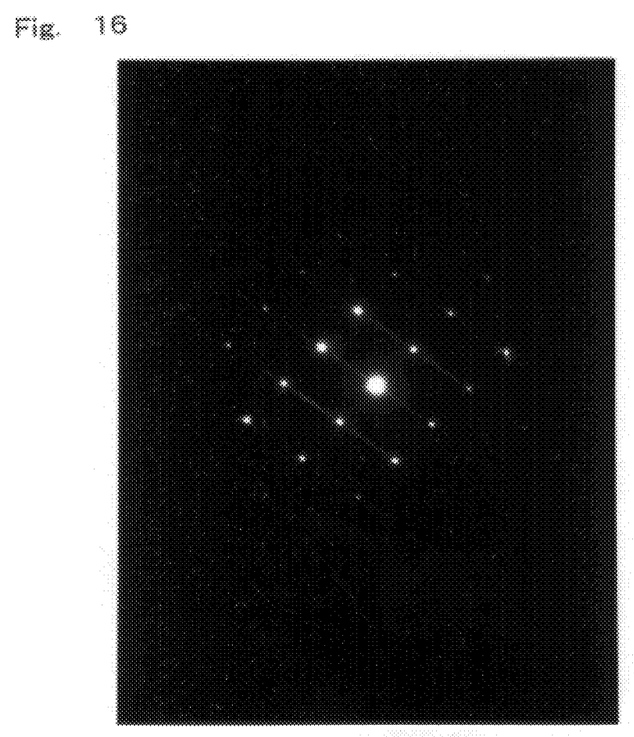
FIG. 16 is a photograph showing an electron diffraction pattern of a crystal structure of the transition-type alumina shown in FIG. 6 after it was heated at 1400° C. for 6 hours, wherein δ-alumina is shown.
Figure 17:
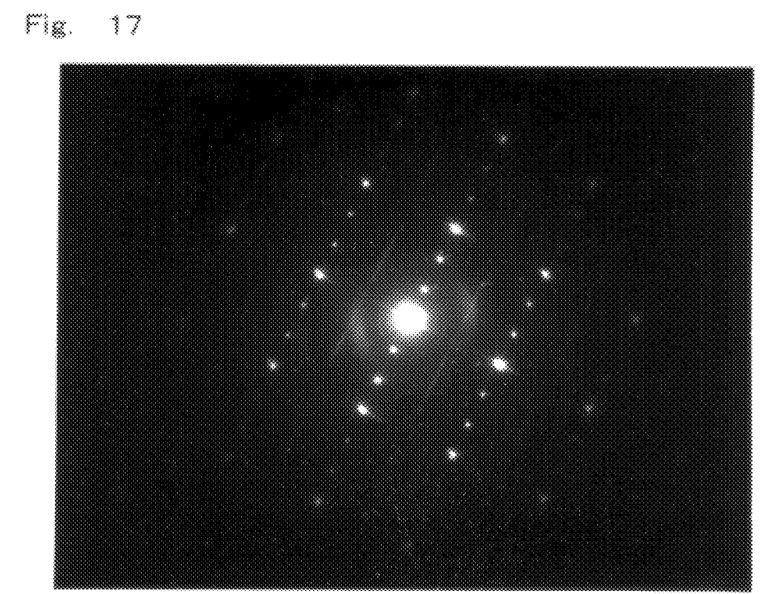
FIG. 17 is a photograph showing an electron diffraction pattern of a crystal structure of the transition-type alumina shown in FIG. 6 after it was heated at 1400° C. for 6 hours, wherein θ-alumina is shown.
Figure 18:
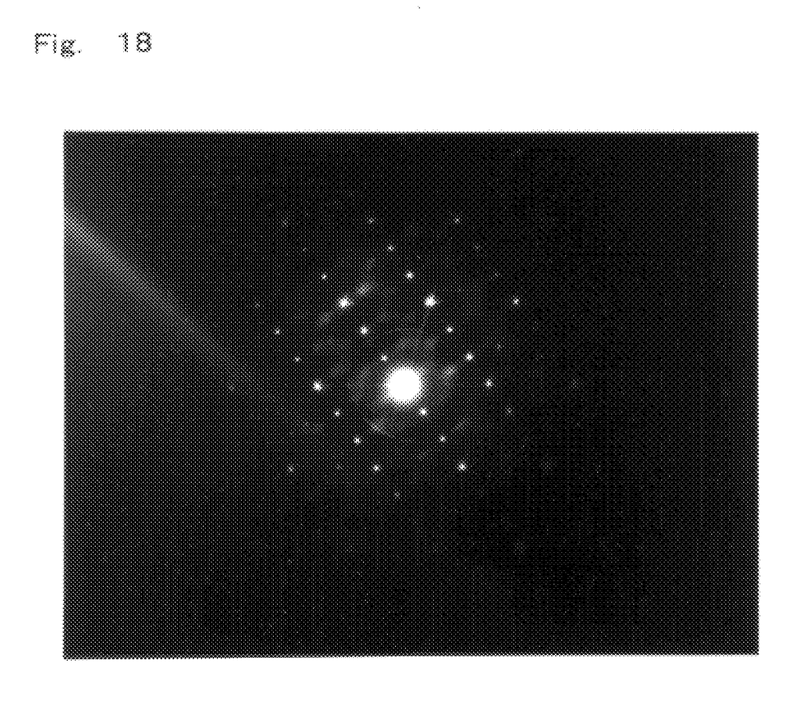
FIG. 18 is a photograph showing an electron diffraction pattern of a crystal structure similar to that shown in FIG. 17, wherein θ-alumina is shown.
Figure 19:
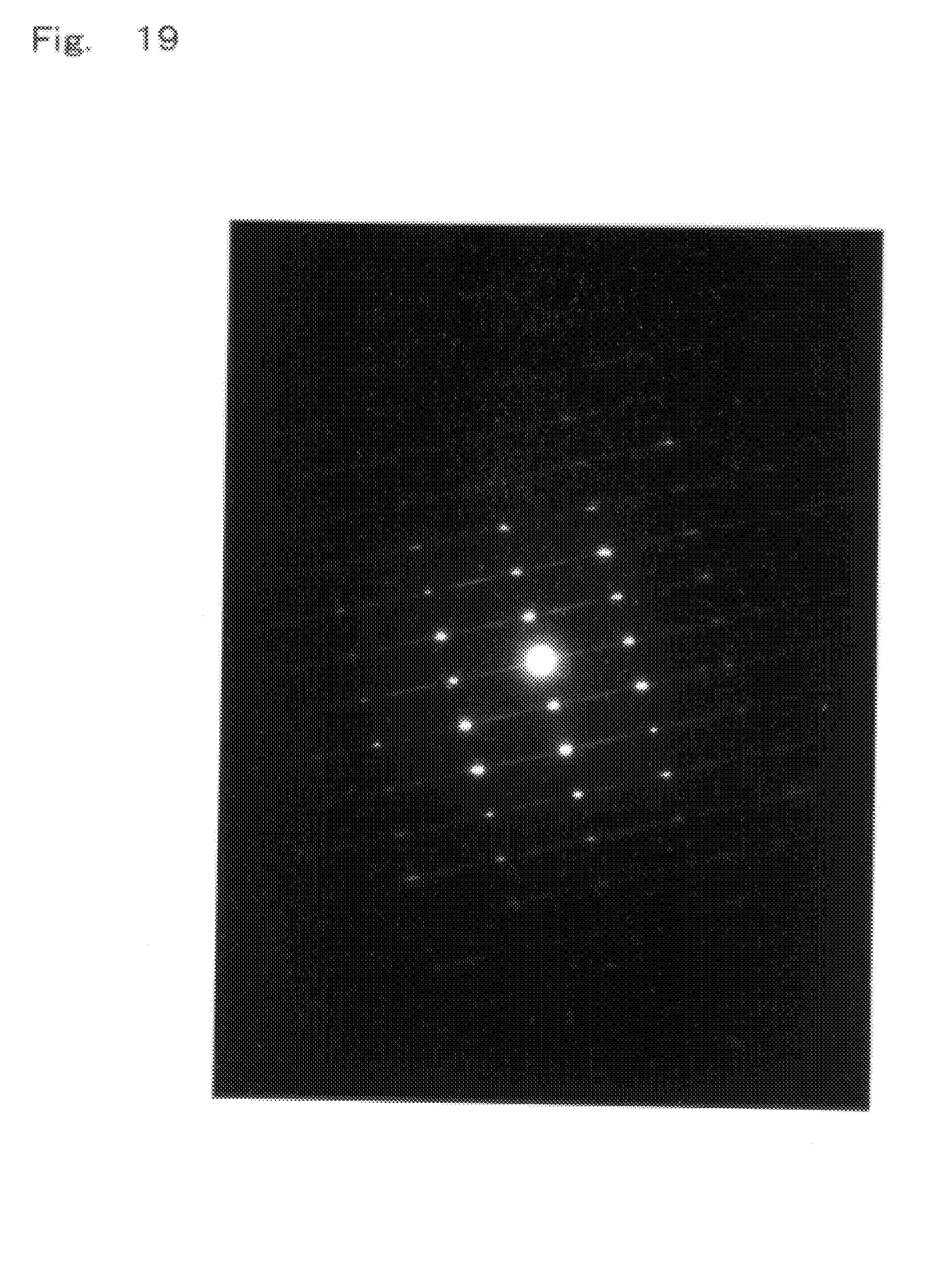
FIG. 19 is a photograph showing an electron diffraction pattern of a crystal structure similar to that shown in FIG. 17, wherein θ-alumina is shown.

Through observation in many different visual fields, the proportion of the cases of no progress of particle growth was estimated to be about 20–30%. The crystal structure was investigated by electron diffraction in the case of FIG. 14, where particle growth considerably progressed. No $\alpha$-alumina was observed, but the entire crystal structure was $\theta$-alumina, as can be seen from FIG. 15. Thus, it is understood that the transition-type alumina of the invention retains a crystal transition-type alumina of the invention retains a crystal configuration of transition-type even when particle growth progresses.

Electron diffraction patterns of the magnesium element-containing transition-type alumina powder after being heated at 1400° C. for 6 hours (the one shown in FIG. 6) were determined. Results are shown in FIGS. 16, 17, 18 and 19. Based on the electron diffraction pattern in FIG. 16, the transition-type alumina is $\delta$-alumina. Based on the electron diffraction patterns in FIGS. 17–19, the transition-type alumina is $\theta$-alumina. This indicates presence of a crystal structure that causes such a streak in a specific direction. Such a crystal structure is considered to be an effect of magnesium element contained in a small amount.

The high-temperature stable transition-type alumina of the invention does not undergo phase-transformation into $\alpha$-alumina even at high temperatures that exceed 1000–1200° C., at which conventional transition-type aluminas start to transform into $\alpha$-alumina, by at least 200° C. or, further, by at least 300° C. Although a small amount of magnesium element is contained, the high-temperature stable transition-type alumina of the invention is of single crystal type. That is, the high-temperature stable transition-type alumina of the invention is essentially different from $\alpha$-alumina which contains magnesium in the form of MgO and which is a polycrystal sintered material. The high-temperature stable transition-type alumina of the invention is suitable as a carrier of an automotive exhaust gas cleaning catalyst, which is frequently exposed to high temperatures.

It will be apparent to those skilled in the art that various modifications and variations can be made in the high-temperature stable alumina and method of manufacturing the same of the present invention without departing from the spirit or scope of the invention. Thus, it is intended that the present invention cover the modifications and variations of this invention provided they come within the scope of the appended claims and their equivalents.

What is claimed is:

1. A high-temperature stable alumina consisting essentially of 0.1 to 50 atom % of magnesium relative to 100 atom % of aluminum contained in the alumina.

2. The high-temperature stable transition-type alumina according to claim 1, wherein the magnesium is contained in an amount of 0.3 to 30 atom %.

3. The high-temperature stable alumina according to claim 1, wherein the alumina is stable at a temperature of 1300 to 1600° C., so that a transformation to $\alpha$-alumina does not occur.

4. The high-temperature stable alumina according to claim 1, wherein the alumina has a single crystal structure.

5. The high-temperature stable alumina according to claim 1, wherein the alumina includes δ-alumina or θ-alumina.

6. The high-temperature stable alumina according to claim 1, wherein the alumina is formed of a powder.

* * * * *